US 11,751,539 B2

(12) United States Patent
Durden

(10) Patent No.: US 11,751,539 B2
(45) Date of Patent: Sep. 12, 2023

(54) HORSE TOY APPARATUS

(71) Applicant: Alan Michael Durden, Toledo, OH (US)

(72) Inventor: Alan Michael Durden, Toledo, OH (US)

( * ) Notice: Subject to any disclaimer, the term of this patent is extended or adjusted under 35 U.S.C. 154(b) by 279 days.

(21) Appl. No.: 17/125,071

(22) Filed: Dec. 17, 2020

(65) Prior Publication Data

US 2022/0192155 A1  Jun. 23, 2022

(51) Int. Cl.
*A01K 15/02* (2006.01)
*F16M 13/02* (2006.01)

(52) U.S. Cl.
CPC ......... *A01K 15/025* (2013.01); *F16M 13/022* (2013.01)

(58) Field of Classification Search
CPC .................................................... A01K 15/025
See application file for complete search history.

(56) References Cited

U.S. PATENT DOCUMENTS

| | | | | |
|---|---|---|---|---|
| 2,194,736 A * | 3/1940 | De Bruler | ............ | A01K 15/025 119/711 |
| 2,800,105 A * | 7/1957 | Ilg | ........................ | A01K 15/025 482/37 |
| 4,691,851 A * | 9/1987 | Aaserude | ................ | B60R 11/00 224/567 |
| 5,103,770 A * | 4/1992 | Berkovich | ........... | A01K 15/025 446/236 |
| 5,474,032 A * | 12/1995 | Krietzman | ........... | A01K 15/025 473/430 |
| 5,535,703 A * | 7/1996 | Kerzner | ............... | A01K 15/025 119/707 |
| 5,582,403 A * | 12/1996 | George | .............. | A63B 69/0091 473/424 |
| 5,683,315 A * | 11/1997 | Ring | .................. | A63B 69/0079 473/30 |
| 5,989,137 A * | 11/1999 | Krueger | ............. | A63B 69/0091 473/429 |
| 6,290,618 B1 * | 9/2001 | Ring | .................. | A63B 69/0002 473/422 |
| 10,874,088 B1 * | 12/2020 | Soto | ...................... | A01K 15/025 |
| 2006/0054105 A1 * | 3/2006 | Renforth | .............. | A01K 15/025 119/708 |
| 2010/0199923 A1 * | 8/2010 | del Pinal | .............. | A01K 15/025 119/707 |

(Continued)

FOREIGN PATENT DOCUMENTS

| | | | | |
|---|---|---|---|---|
| CA | 3038329 A1 * | 10/2019 | .......... | A01K 15/025 |
| CN | 111096238 A * | 5/2020 | | |
| CN | 111150968 A * | 5/2020 | | |

*Primary Examiner* — Brady W Frazier
*Assistant Examiner* — Shanna Danielle Glover
(74) *Attorney, Agent, or Firm* — JORDAN IP LAW, LLC

(57) ABSTRACT

A toy apparatus for a horse to play with when kept in a stall of a stable. The toy apparatus includes an elongated rod member, a base frame member to support the elongated rod member on the stall, and a connection system to pivotally connect the elongated rod member to the base frame member in a manner such that, when the toy apparatus is in an installation position on the stall, the elongated rod member is to project into the stall for engagement by the horse which causes the elongated rod member to pivot relative to the base frame member.

20 Claims, 6 Drawing Sheets

(56) References Cited

U.S. PATENT DOCUMENTS

| | | | |
|---|---|---|---|
| 2011/0209671 A1* | 9/2011 | Forhan | A01K 15/025 136/244 |
| 2014/0091193 A1* | 4/2014 | Simon | F16M 11/105 248/458 |
| 2017/0013805 A1* | 1/2017 | Yannello | A01K 15/025 |
| 2017/0245468 A1* | 8/2017 | Barrett | A01K 15/025 |
| 2018/0343833 A1* | 12/2018 | Willingham | A01K 15/025 |
| 2019/0343079 A1* | 11/2019 | Gipson | A01K 15/027 |
| 2020/0229399 A1* | 7/2020 | Wolfgram | A01K 15/025 |
| 2020/0323171 A1* | 10/2020 | Crosby | A01K 15/025 |
| 2020/0352135 A1* | 11/2020 | Reynolds | B25J 9/1633 |
| 2020/0359592 A1* | 11/2020 | Hanskamp | A01K 23/005 |
| 2021/0185982 A1* | 6/2021 | Bush | F16M 11/06 |
| 2022/0061267 A1* | 3/2022 | Prokop | A01K 15/025 |

* cited by examiner

HORSE TOY APPARATUS

TECHNICAL FIELD

Embodiments relate generally to a toy apparatus for a horse to play with when kept in a stall of a stable.

BACKGROUND

A stable is a building used to store or keep livestock such as horses. Stables are generally divided into one or more separate stalls to keep individual horses. Horses can spend a considerable amount of time confined in their stalls. Like any animal, horses like to be engaged by playing with a human or with other engagement activities.

BRIEF SUMMARY

In one or more embodiments, a toy apparatus for horses comprises one or more of the following: a base frame member to support an elongated rod member to which a horse may engage when kept in a stall of a stable. The base frame member is composed of wood, a polymeric material (e.g., rubber), or any combinations thereof, and is configured for connection at a region outside of the stall of the stable in a manner that the elongated rod member is to project into the stall for engagement by the horse. In that way, the elongated rod member mimics a broom stick (when a stall is being cleaned) leaning into a horse's stall from an area outside of the stall, projecting a portion of the elongated rod member into the stall to be engaged by the horse. The base frame member and the elongated rod member collectively form a cognitive optical illusion apparatus. The overall weight of the toy apparatus and the base support connectors do not allow the horse to move the toy apparatus in a way it isn't designed e.g., (up and down the stall bars).

In one or more embodiments, a toy apparatus for a horse kept in a stall of a stable comprises one or more of the following: an elongated rod member; a base frame member to support the elongated rod member; and a three-point connection system, comprising one or more elastic members, to pivotally connect the elongated rod member to the base frame member in a manner such that, when the toy apparatus is in an installation position on the stall, the elongated rod member is to project into the stall for engagement by the horse which causes the elongated rod member to pivot relative to the base frame member.

In one or more embodiments, a toy apparatus for a horse kept in a stall of a stable comprises one or more of the following: an elongated rod member; a base frame member to support the elongated rod member; and a connection system to pivotally connect the elongated rod member to the base frame member to facilitate movement of the elongated rod member relative to the base frame member when engaged by the horse, the connection system including one or more elastic members to pivotally connect the elongated rod member to the base frame member at a plurality of connection points.

In one or more embodiments, a toy apparatus for a horse kept in a stall of a stable comprises one or more of the following: an elongated rod member having a rubber coating at a distal region thereof; a base frame member to support the elongated rod member, the base frame member including a pair of spaced apart base frame arms extending from a base frame support; and a connection system to pivotally connect the elongated rod member to the base frame member to facilitate movement of the elongated rod member relative to the base frame member when engaged by the horse, the connection system including a first elastic member to pivotally connect the elongated rod member to the base frame support at a first connection point, and a second elastic member to pivotally connect the elongated rod member to a first base frame arm at a second connection point and to a second base frame arm at a third connection point.

A distal region of the elongated rod member may be encapsulated with a rubber coating in order to provide safety against injury to the horse when engaging the toy apparatus.

The bottom surface of each base frame arm may have semi-circular cut-out extending longitudinally to facilitate mounting of the toy apparatus to stall bars. The cut-outs are sized to at least partially receive a respective stall bar. Once mounted, the base frame member is secured to the stall via one or more base support connectors (e.g., clamps) that are removeably connected to the base frame member. The clamps may be composed of a metal material, or of a nylon material having metal endings for receipt by a receiver that locks the toy apparatus a respective stall bar.

A mechanical faster such as, for example, a locking rod, is to secure or connect an elastic member to an outer surface of the respective base frame arm.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

As illustrated in FIGS. 1 to 6, a toy apparatus 10 is provided for a horse to play with when kept in a stall S of a stable. The toy apparatus 10 comprises a base frame member 20, an elongated rod member 30 which is supported by the base frame member 20 for engagement (i.e., push or pull) by the horse, and a connection system 40 to facilitate suspension of and pivoting movement by the elongated rod member 30 relative to the base frame member 20.

Base Frame Member

Figure 1:
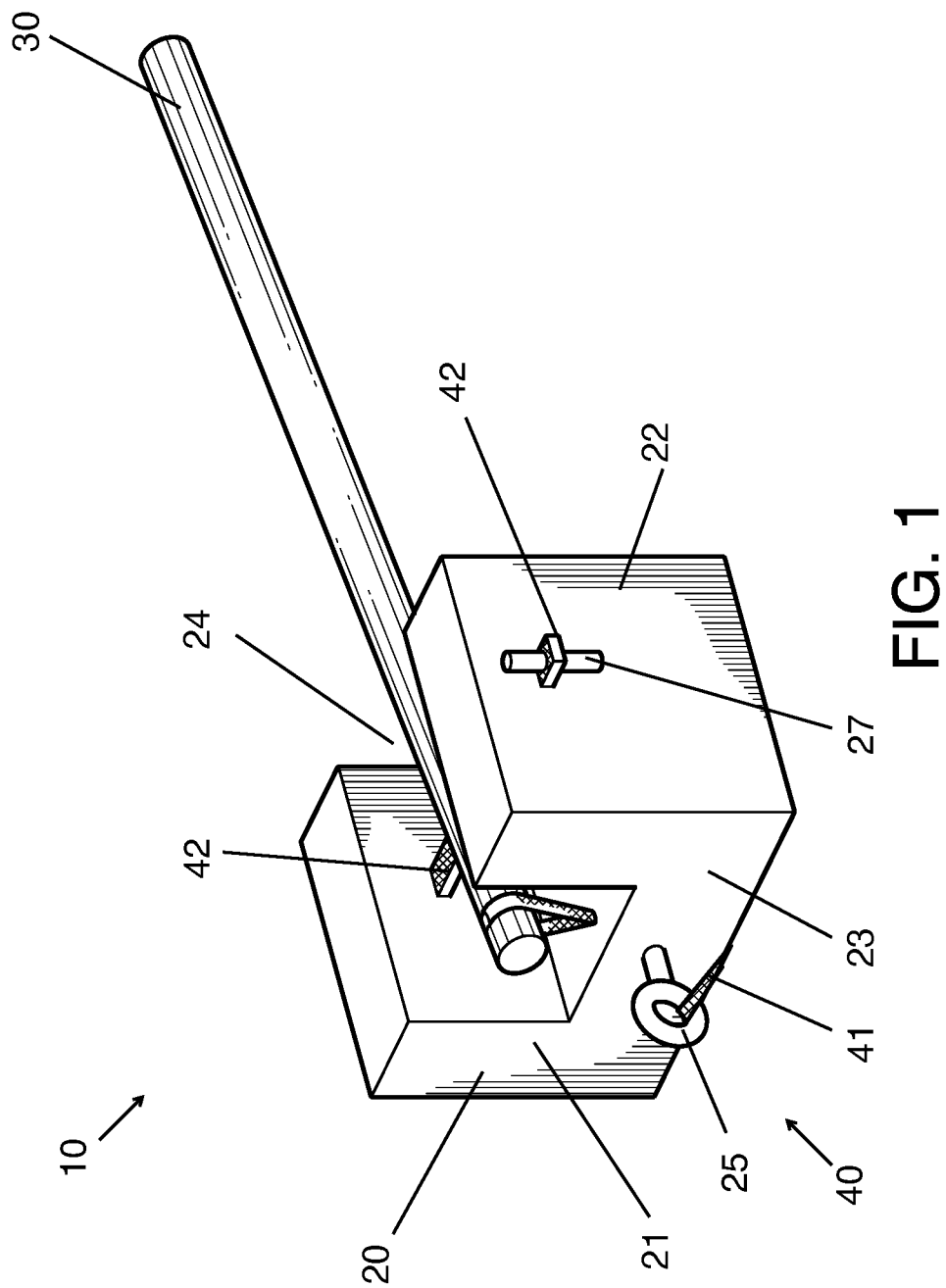
FIG. 1 is a perspective view of an example of a toy apparatus, in accordance with one or more embodiments.
Figure 2:
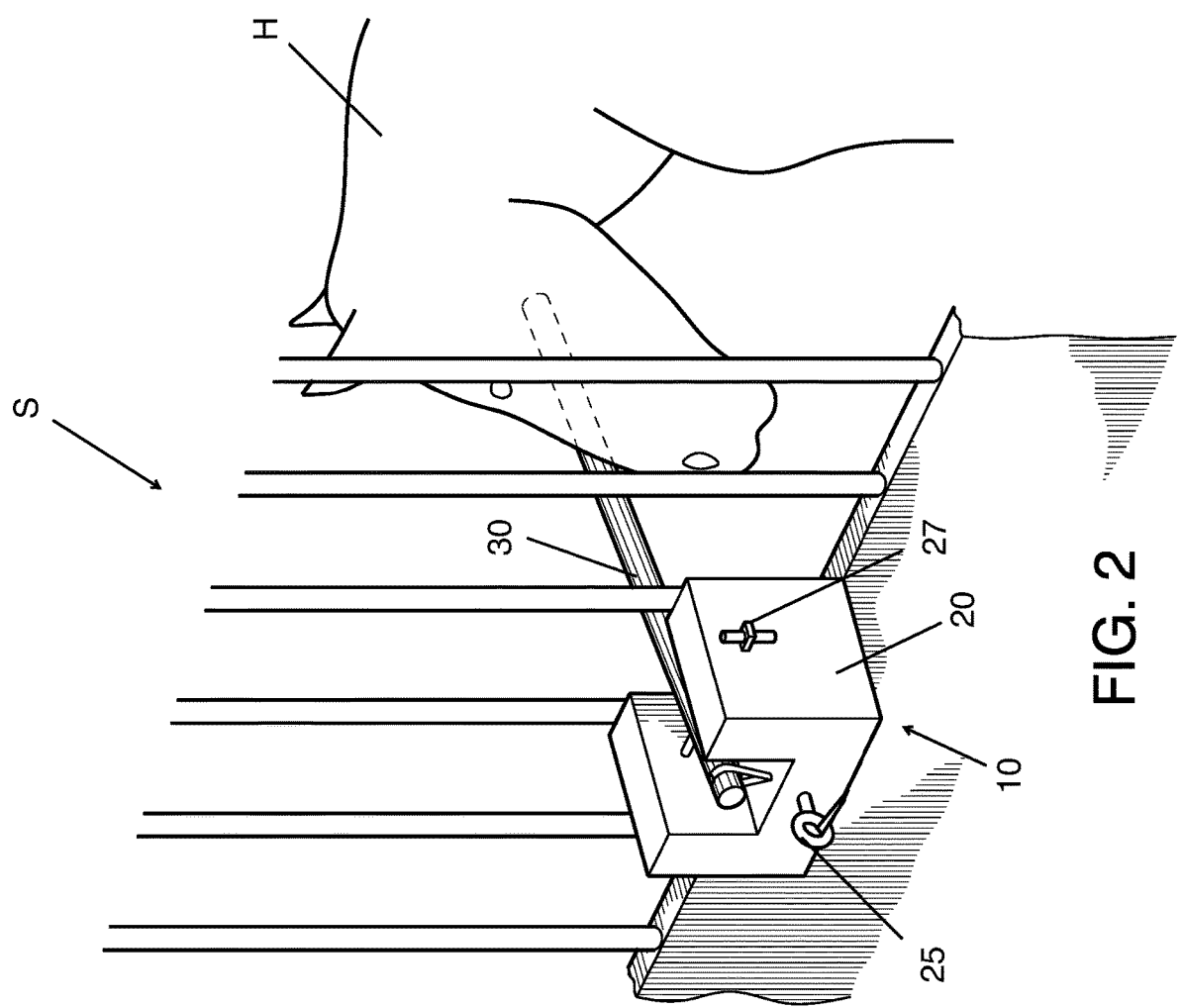
FIG. 2 is a perspective view of the toy apparatus of FIG. 1, mounted in an installation position on a stall.

As illustrated in FIG. 1, in one or more embodiments, the base frame member 20 comprises a substantially U-shaped configuration that includes a pair of spaced apart base frame arms 21, 22 extending in a direction normal or perpendicular to a base frame support 23. The base frame arms 21, 22 are spaced apart by the length of the base frame support 23 to define a space 24 by which the elongated rod member 30 is supported for suspension relative to the base frame member 20. In particular, the base frame arms 21, 22 may be spaced a distance that facilitates a removable connection of the toy apparatus 10 to the stall bars 60 of the stall S while also permitting extension of the rod member 30 through the space between the stall bars 60.

An outer surface of each base frame arm 21, 22 is configured to engage the stall bars 60 of the stall S when the toy apparatus 10 is in an installation position on the stall S. The base frame member 20 may be composed, in whole or in part, of a generally durable material such as, for example, wood, metal, a polymeric material (e.g., rubber), or any combinations thereof. Although the illustrated embodiment shows the base frame member 20 as a substantially U-shaped design, this disclosure contemplates the base frame member 20 having any structural configuration (e.g., linear, curvilinear, symmetric, asymmetric, etc.) that falls within the spirit and scope of the principles of this disclosure set forth herein.

Figure 5:
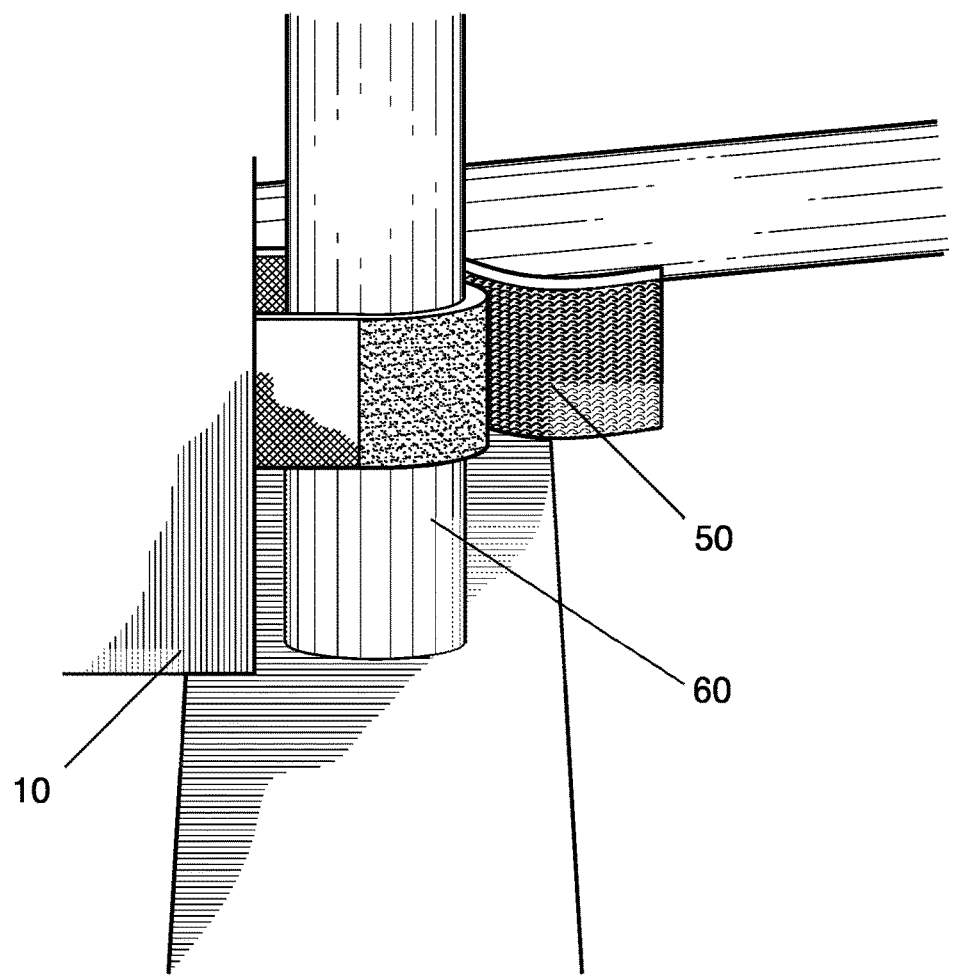
FIG. 5 is a side view of the base support connectors of the toy apparatus of FIG. 1.

The outer surface of each base frame arm 21, 22 may have semi-circular cut-out (not illustrated) extending longitudinally to facilitate mounting of the toy apparatus 10 to stall bars 60 in the installation position. The cut-outs are sized to at least partially receive a respective stall bar 60. Once mounted on the stall S, the base frame member 20 is secured to the stall S via one or more base support connectors 50 (e.g., clamps) that are removeably connected to the base frame member 20. The base support connectors 50 may be composed of a metal material, or of a nylon material having metal endings for receipt by a receiver that locks the toy apparatus a respective stall bar. As illustrated in FIG. 5, in an example, the base support connectors 50 may comprise straps such as Velcro™ nylon straps that are connectable to corresponding Velcro™ nylon straps. Embodiments, however, are not limited therewith, and thus, this disclosure contemplates the clamps 50 having any material composition that falls within the spirit and scope of the principles of this disclosure set forth herein. For example, the base support connectors 50 may comprise a metal pipe fastener and can be of a wing nut design.

The base frame member 20 may have a structural configuration that facilitates releasable connection to an outside region of the stall S that is exterior to an interior space inside of the stall S. When the toy apparatus 10 is in an installation on the stall S, the elongated rod member 30 is to project into the interior space of the stall S for engagement by the horse. In that way, the elongated rod member 30 mimics a broom stick (used by a stall worker during cleaning of the stall S) leaning into the stall from an area outside of the stall S, projecting a portion of the elongated rod member 30 into the stall S to be engaged by the horse.

Elongated Rod Member

Figure 6:
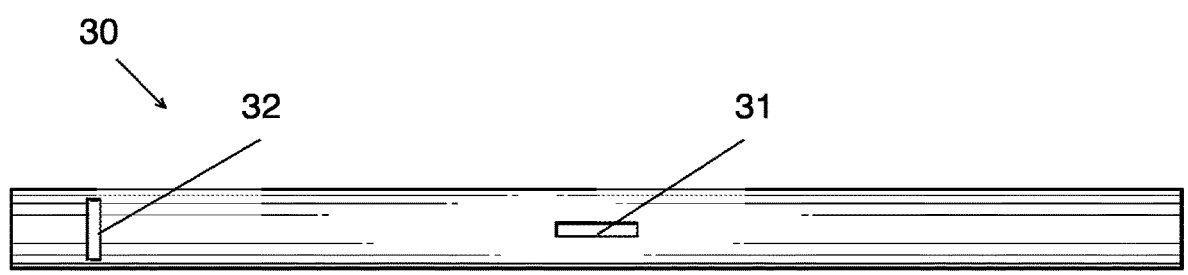
FIG. 6 is a top view of the rod member of the toy apparatus of FIG. 1.

As illustrated in FIG. 6, the elongated rod member 30 has a generally cylindrical configuration or cross-section. Although the illustrated elongated rod member 30 has a subtantially cylindrical cross-section, embodiments are not limited therewith, and thus, this disclosure contemplates an elongated road member 30 comprising any structural configuration that falls within the spirit and scope of the principles of this disclosure set forth herein.

The elongated rod member 30, at the mid-region thereof, comprises a first slit or through hole 31 having a rectangular cross-section. The elongated rod member further includes a second rectangular slit or through hole 32 at the rear or base region thereof to permit the passing through of one or more first elastic members 41 to facilitate suspension of the elongated rod member 30 at the base frame member 20. A distal region of the elongated rod member 30 may be encapsulated with a rubber coating (not illustrated) to provide safety against injury to the horse when engaging the toy apparatus 10.

Connection System

Figure 3:
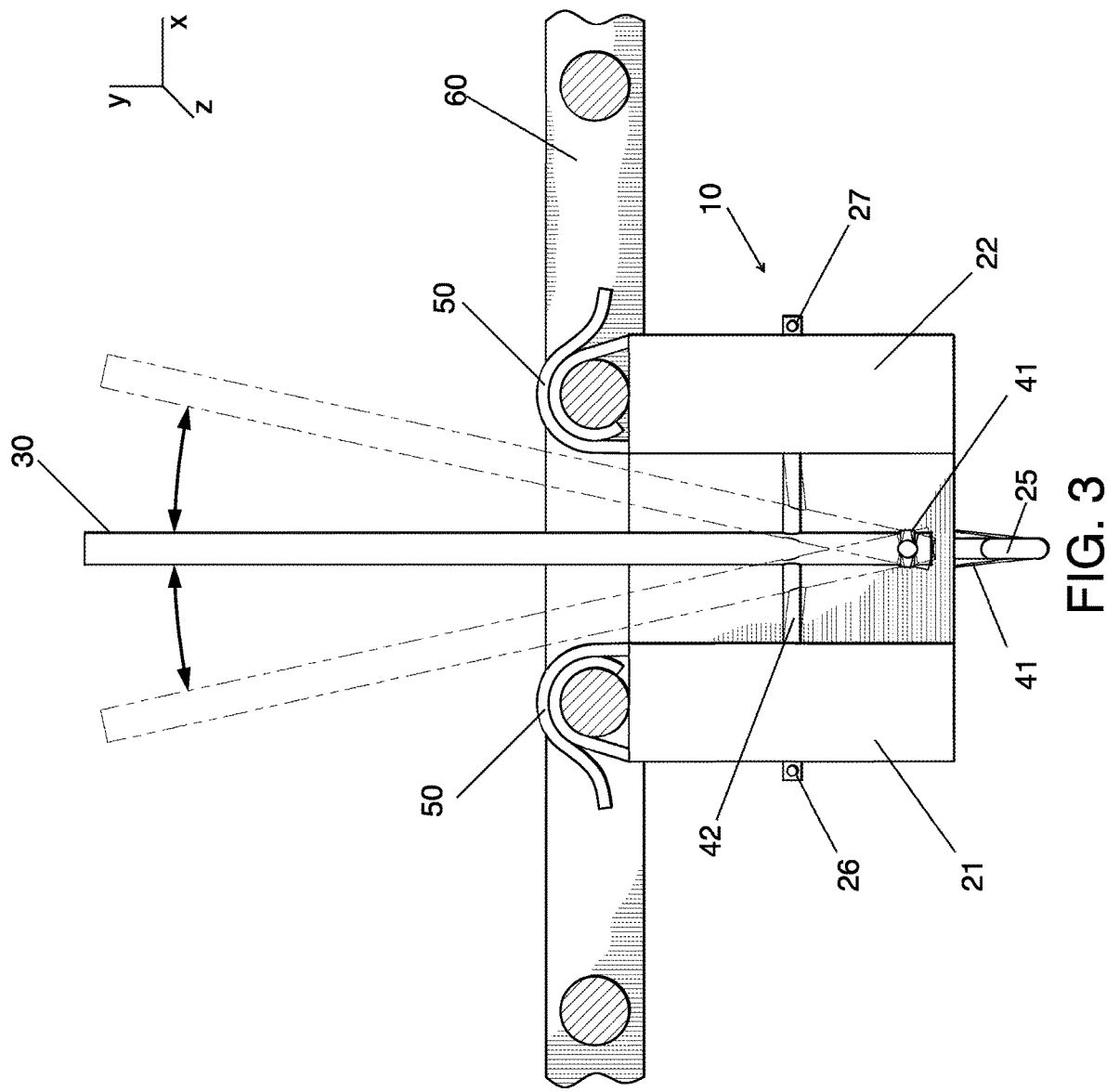
FIG. 3 is a top view of the toy apparatus of FIG. 1, mounted in an installation position on a stall.

As illustrated in FIG. 3, in one or more embodiments, the connection system 40 is to facilitate suspension of the elongated rod member 30 at the space 24 through a multi-point connection to the base frame member 20. The multi-point connection facilitates connection and multi-directional pivoting movement by the elongated rod member 30 relative to the base frame member 20 when engaged by a horse.

Figure 4:
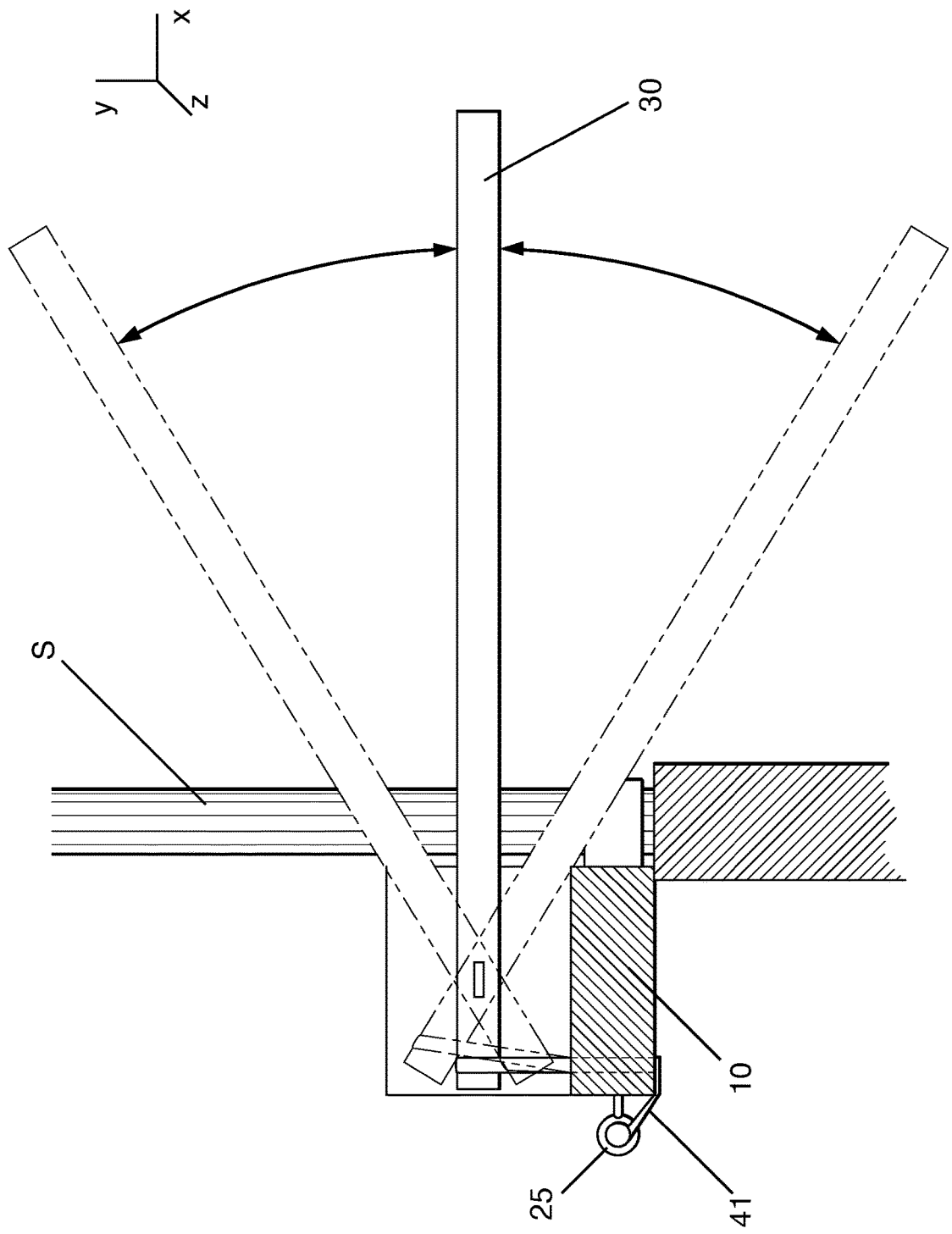
FIG. 4 is a side view of the toy apparatus of FIG. 1, mounted in an installation position on a stall.

In one or more embodiments, the connection system 40 comprises one or more elastic members 41, 42 to pivotally connect the elongated rod member 30 to the base frame member at a plurality of connection points. As illustrated in FIGS. 3 and 4, such a connection is to facilitate, when the toy apparatus 10 is in the installation position, projection of the elongated rod member 30 into an interior space of the stall S for engagement by the horse which causes the elongated rod member 30 to pivot upwardly, downwardly, and/or laterally relative to the base frame member 20. In one or more embodiments, the one or more elastic members 41, 42 may respectively comprise a bungee cord. This disclosure contemplates one or more embodiments of the elastic members 41, 42 comprising any structural configuration that falls within the spirit and scope of the principles of this disclosure set forth herein.

In one or more embodiments, the one or more elastic members comprises a first elastic member 41 and a second elastic member 42. The first elastic member 41 is configured to pivotally connect the elongated rod member 30 to the base frame support 23 at a first connection point or region 25. The first elastic member 41 is connected at distal end thereof to a base or rear region of the elongated rod member 30, and at a proximate end thereof to the base frame support 23 at a first connection point or region 25. The first connection point or region 25 is located at the base frame support 23. The first connection point 25 is defined by a mechanical connector such as, for example, an eye bolt that is connected to the base frame member 20 at the base frame support 23. Although the illustrated embodiment shows an eye bolt, this disclosure contemplates the mechanical fastener comprising any type of fastener that falls within the spirit and scope of the principles of this disclosure set forth herein. In an example, the first elastic member 41 may extend through a first slit or hole 31 in the elongated rod member 30 to establish a connection to the elongated rod member 30 (See, FIG. 7).

Figure 7:
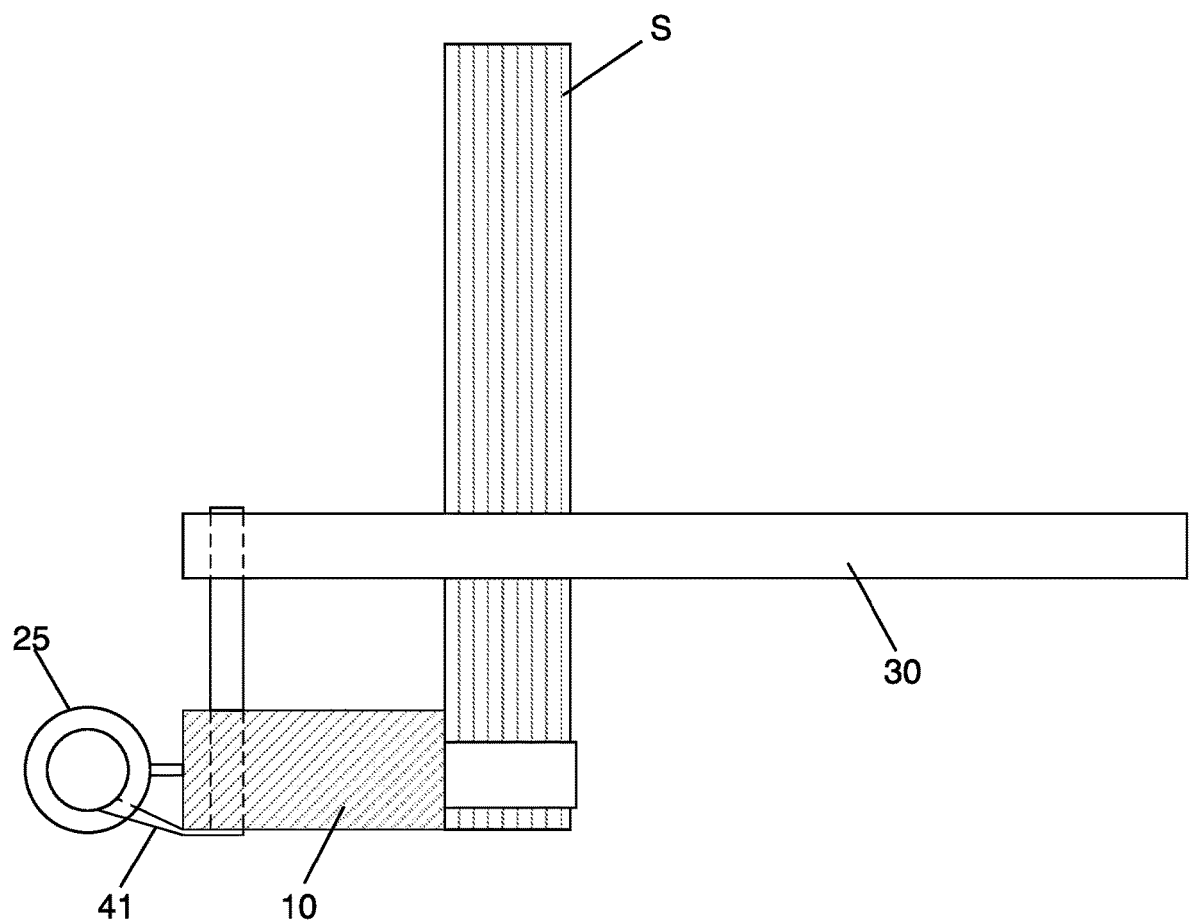
FIG. 7 is a side view of an embodiment of a toy apparatus, mounted in an installation position on a stall.

As illustrated in FIG. 7, the first elastic member 41 may then extend through a hole in the base frame member 20 for connection to the base frame support 23 at the first connection point 25 (e.g., the eye bolt). This disclosure contemplates alternative configurations that facilitate connection of the first elastic member 41 to the base frame member 20 in a manner that falls within the spirit and scope of the principles of this disclosure set forth herein.

The second elastic member 42 is configured to pivotally connect the elongated rod member 30 to: (i) the first base frame arm 21 at a second connection point or region 26, and (ii) the second base frame arm 22 at a third connection point or region 27. The second elastic member 42 is connected to the first base frame arm 21 at the second connection point or region 26 and the second base frame arm 22 at the third connection point or region 27, defined by one or more mechanical connectors (e.g., a locking rod). Such connections may be selectively adjusted manually to permit loosening or tightening of the connection. A wedge member (e.g., a grommet) may be received at each end of the rectangular slit to maintain the position of the elongated rod member 30 in a manner that prevents unwanted shifting or lateral movement of the elongated rod member 30.

The second elastic member 42 extends between and is connected to a second/mid region of the elongated rod member 30 at a region of the elongated rod member 30 that is longitudinally spaced from (e.g., the downstream) of the base or rear region of the elongated rod member 30. The second connection point or region 26 is located at the first base frame arm 21 and the third connection point or region 27 is located at the second base frame arm 22. Particularly, the second elastic member 42 extends through: (i) the first slit 31 of the elongated rod member 30, (ii) a passage or through hole in the first base frame arm 21 for connection thereto, and (iii) a passage or through hole in the second base frame arm 22 for connection thereto.

In an example, in order to connect the second elastic member 42 that is arranged to extend through the rectangular-shaped first slit 31 of the rod member 30, and also through respective through holes in both base frame arms 21, 22, a metal bar is used. The second elastic member 42 may have two loops: one that extends through a through hole in the first base frame arm 21 and terminates at the outside surface of the first base frame arm 21. The metal bar is placed through a corresponding loop in order to maintain the second elastic member 42 in position due to the metal bar having a length that is greater than the diameter of the corresponding through hole.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

REFERENCE SYMBOLS
10 Toy apparatus
20 Base frame member
21 Base frame arm
22 Base frame arm
23 Base frame support
24 Space in base frame member
25 First Connection Point
26 Second Connection Point
27 Third Connection Point
30 Elongated rod member
31 First slit or through hole
32 Second slit or through hole
40 Connection system
41 First elastic member
42 Second elastic member
50 Base support connectors
60 Stall bar(s)
S Stall

What is claimed is:

1. A toy apparatus for a horse kept in a stall of a stable, the toy apparatus comprising:
   an elongated rod member comprising one or more slits and/or through holes;
   a base frame member to support the elongated rod member on the stall; and
   a three-point connection system, comprising one or more elastic members to pivotally connect the elongated rod member to the base frame member in a manner such that, when the toy apparatus is in an installation position on the stall, the elongated rod member is to project into the stall for engagement by the horse which causes the elongated rod member to pivot relative to the base frame member,
   wherein the one or more elastic members comprise at least a first elastic member extending over or through the one or more slits and/or through holes of the elongated rod member.

2. The toy apparatus of claim 1, wherein the base frame member comprises a pair of spaced apart base frame arms.

3. The toy apparatus of claim 2, wherein the base frame member comprises a base frame support from which the base frame arms extend.

4. The toy apparatus of claim 3, wherein an outer surface of each base frame arm is configured to engage a respective stall bar of the stall when the toy apparatus is in the installation position.

5. The toy apparatus of claim 1, wherein the base frame member comprises a substantially U-shaped configuration.

6. The toy apparatus of claim 2, the base frame arms and the base frame support define a space by which the elongated rod member is supported for suspension.

7. The toy apparatus of claim 5, wherein the three-point connection system comprises the one or more elastic members configured to pivotally connect the elongated rod member for suspension in a space at a first connection point at the base frame support, a second connection point at a first base frame arm, and a third connection point at a second base frame arm.

8. A toy apparatus for connection to a stall of a horse stable, the toy apparatus comprising:
   an elongated rod member comprising one or more slits and/or through holes;
   a base frame member to support the elongated rod member on the stall; and
   a connection system to pivotally connect the elongated rod member to the base frame member to facilitate movement of the elongated rod member relative to the base frame member when engaged by the horse, the connection system including one or more elastic members to pivotally connect the elongated rod member to the base frame member at a plurality of connection points,
   wherein the one or more elastic members comprise at least a first elastic member extends over or through the one or more slits and/or through holes of the elongated rod member.

9. The toy apparatus of claim 8, wherein the base frame member comprises a pair of spaced apart base frame arms.

10. The toy apparatus of claim 9, wherein the base frame member comprises a base frame support from which the base frame arms extend.

11. The toy apparatus of claim 10, wherein an outer surface of each base frame arm is configured to engage a respective stall bar of the stall when the toy apparatus is in an installation position.

12. The toy apparatus of claim 10, wherein the base frame arms and the base frame support define a space by which the elongated rod member is supported for suspension.

13. The toy apparatus of claim 8, wherein the base frame member comprises a substantially U-shaped configuration.

14. The toy apparatus of claim 8, wherein the one or more elastic members comprise the first elastic member connected to the base frame support, and a second elastic member connected to a second connection point and a third connection point on the base frame support.

15. A toy apparatus for connection to a stall of a horse stable, the toy apparatus comprising:
- an elongated rod member comprising one or more slits and/or through holes and having a rubber coating at a distal region thereof;
- a base frame member to support the elongated rod member on the stall, the base frame member including a pair of spaced apart base frame arms extending from a base frame support; and
- a connection system to pivotally connect the elongated rod member to the base frame member to facilitate movement of the elongated rod member relative to the base frame member when engaged by the horse, the connection system including a first elastic member connected to the base frame support at a first connection point, and a second elastic member connected to a first base frame arm at a second connection point on the base frame member and to a second base frame arm to a third connection point on the base frame member,
- wherein the first elastic member extends over or through the one or more slits and/or through holes of the elongated rod member.

16. The toy apparatus of claim 15, wherein an outer surface of each base frame arm is configured to engage a respective stall bar of the stall when the toy apparatus is in an installation position.

17. The toy apparatus of claim 15, wherein the base frame arms and the base frame support define a space by which the elongated rod member is supported for suspension.

18. The toy apparatus of claim 15, wherein the base frame member comprises a substantially U-shaped configuration.

19. The toy apparatus of claim 15, wherein the elongated rod member comprises a first slit at a mid region thereof through which the first elastic member extends to facilitate suspension of the elongated rod member to the base frame support.

20. The toy apparatus of claim 15, wherein the elongated rod member comprises a second slit at a rear-region thereof through which the second elastic member extends to facilitate suspension of the elongated rod member to the base frame arms.

* * * * *